(12) United States Patent
Arunachalam et al.

(10) Patent No.: US 12,003,288 B2
(45) Date of Patent: Jun. 4, 2024

(54) CALIBRATION FOR ANTENNA ELEMENTS OF A MULTI-ANTENNA STRUCTURE (71) Applicant: Telefonaktiebolaget LM Ericsson (publ), Stockholm (SE)

(72) Inventors: Jagadeesh Arunachalam, Malmö (SE); Jens Jansson, Eslöv (SE); Kjell Andersson, Rydebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 17/617,038

(22) PCT Filed: Jun. 7, 2019

(86) PCT No.: PCT/EP2019/065029
§ 371 (c)(1),
(2) Date: Dec. 7, 2021

(87) PCT Pub. No.: WO2020/244783
PCT Pub. Date: Dec. 10, 2020

(65) Prior Publication Data
US 2022/0231737 A1 Jul. 21, 2022

(51) Int. Cl.
*H04B 7/0456* (2017.01)
*H04B 17/318* (2015.01)
*H04B 17/336* (2015.01)

(52) U.S. Cl.
CPC ......... *H04B 7/0456* (2013.01); *H04B 17/318* (2015.01); *H04B 17/336* (2015.01)

(58) Field of Classification Search
CPC .. H04B 7/0456; H04B 17/318; H04B 17/336; H04B 17/345; H04B 7/0408;
(Continued)

(56) References Cited

U.S. PATENT DOCUMENTS 5,808,578 A 9/1998 Barbella et al.
11,606,125 B2 * 3/2023 Aue .................. H04B 17/21
(Continued)

FOREIGN PATENT DOCUMENTS

CN 102324944 B 6/2014
CN 107493142 A 12/2017
(Continued)

OTHER PUBLICATIONS

Luo, Xiliang, et al., "How to Calibrate Massive MIMO?," Workshop on 5G & Beyond—Enabling Technologies and Applications, 2015, IEEE ICC, pp. 1119-1124.
(Continued)

*Primary Examiner* — Khanh C Tran
(74) *Attorney, Agent, or Firm* — Withrow & Terranova, PLLC (57) ABSTRACT

Disclosed is a method for a communication device comprising a plurality of antenna elements arranged in an antenna array structure and configured to perform dynamic calibration of the antenna elements for beamforming. The method comprises performing interference level measurements and antenna calibration measurements during an antenna calibration opportunity, and adapting the antenna calibration measurements for one or more of the antenna elements based on the measured interference level. Corresponding apparatus, communication device and computer program product are also disclosed.

20 Claims, 4 Drawing Sheets (58) Field of Classification Search
CPC .... H04B 7/0617; H04B 7/0684; H04B 17/10; H04B 17/21; H04B 7/06; H04B 17/14
See application file for complete search history.

(56) References Cited

U.S. PATENT DOCUMENTS

| | | | |
|---|---|---|---|
| 2003/0176166 A1* | 9/2003 | Doi | H04B 7/084 455/24 |
| 2004/0070533 A1 | 4/2004 | Azuma | |
| 2007/0159407 A1* | 7/2007 | Bolle | H01Q 3/2676 342/368 |
| 2011/0195670 A1* | 8/2011 | Dakshinamurthy | H04B 7/0691 455/73 |
| 2015/0146584 A1* | 5/2015 | Wang | H04B 7/0665 370/278 |
| 2015/0236779 A1* | 8/2015 | Jalali | H04B 7/18504 342/367 |
| 2017/0331670 A1* | 11/2017 | Parkvall | H04B 7/0617 |
| 2018/0206141 A1 | 7/2018 | Lupper et al. | |
| 2021/0208285 A1* | 7/2021 | Ulmer | H04B 17/21 |

FOREIGN PATENT DOCUMENTS

| | | |
|---|---|---|
| EP | 3623833 A1 | 3/2020 |
| WO | 2020043310 A1 | 3/2020 |
| WO | 2021114263 A1 | 6/2021 |
| WO | 2023087170 A1 | 5/2023 |

OTHER PUBLICATIONS

International Search Report and Written Opinion for International Patent Application No. PCT/EP2019/065029, dated Feb. 25, 2020, 9 pages.
Author Unknown, "Technical Specification Group Radio Access Network; NR; Base Station (BS) ElectroMagnetic Compatibility (EMC) (Release 15)," Technical Specification 38.113, Version 15.5.0, Mar. 2019, 3GPP Organizational Partners, 31 pages.
Author Unknown, "5G; NR; Physical layer procedures for control," Technical Specification 138.213, Version 16.2.0, Jul. 2020, ETSI, 180 pages.
Author Unknown, "O-RAN Fronthaul Working Group: Control, User and Synchronization Plane Specification," Technical Specification O-RAN.WG4.CUS.0, Version 05.00, 2021, Alfter, Germany, O-RAN ALLIANCE e.V., 292 pages.
Dahlman, et al., "5G NR: The Next Generation Wireless Access Technology," Chapter 9, Transport-Channel Processing, Aug. 9, 2018, Elsevier Ltd., pp. 172-173.
International Search Report and Written Opinion for International Patent Application No. PCT/CN2021/131145, mailed May 11, 2022, 12 pages.

* cited by examiner

CALIBRATION FOR ANTENNA ELEMENTS OF A MULTI-ANTENNA STRUCTURE

This application is a 35 U.S.C. § 371 national phase filing of International Application No. PCT/EP2019/065029, filed Jun. 7, 2019, the disclosure of which is incorporated herein by reference in its entirety.

TECHNICAL FIELD

The present disclosure relates generally to the field of wireless communication. More particularly, it relates to calibration for antenna elements of a multi-antenna structure in a communication device.

BACKGROUND

Massive multiple-input multiple-output (MIMO) is a technology that may be used for enabling high capacity and/or high user throughput (e.g., for fifth generation, 5G, wireless communication). One enabler for massive MIMO systems is support of antenna structures (e.g., antenna arrays) at both transmitter and receiver, wherein an antenna structure comprises a large number of phased antenna elements. Using such multi-antenna structures, beamforming and/or spatial multiplexing can be realized.

For proper beamforming it is desirable that applicable radio paths are convergent, i.e., that they have the same phase and amplitude response. However, different antenna elements may generally experience different radio paths. The different antenna elements may also be associated with differences in implementation of the respective receiver/transmitter chain (e.g., analog filters, feeder lengths, etc.), which typically affects the phase response. Furthermore, the phase response may be varying based on, for example, temperature.

Thus, dynamic calibration for antenna elements (of the transmitter and/or of the receiver) is needed to adapt the communication paths such that they result in constructive combination at the receiver. This is referred to herein as antenna calibration.

The antenna calibration is typically performed per chunk of frequencies (e.g., subcarriers), where a chunk of subcarriers may be referred to as a subcarrier group (SCG). Hence, different SCGs may have different calibration values.

An example antenna calibration scheme is self-calibration. In self-calibration, sequences (typically orthogonal Zadoff-Chu sequences) are injected into the transmitter and receiver chains, and the signal is coupled back into an antenna interface (AI) receiver, where amplitude and phase difference caused by traversing the radio path are measured.

An example antenna calibration scheme is over-the-air (OTA) calibration. In OTA calibration, the receiver node (e.g., a wireless communication device such as a user equipment, UE) assists the transmitter node (e.g., a network node such as a base station, BS—for example a next generation Node B, gNB) in the calibration process. For example, a UE may assist a gNB by measuring the downlink (DL) channel from each antenna element of the transmitter node and reporting corresponding channel estimates to the gNB. Alternatively or additionally, a UE may assist a gNB by sending sounding pilots in the uplink (UL) that the gNB may use to estimate the UL channel. Antenna calibration factors may then be calculated based on the channel estimates. One approach for such a calculation is described in Xiliang Luo and Xin Wang: "How to Calibrate Massive MIMO?", IEEE ICC 2015, Workshop on 5G & Beyond—Enabling Technologies and Applications, pp. 1119-1124.

However, performance results of antenna calibration according to known might be improved.

Therefore, there is a need for new approaches to antenna calibration.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a communication device comprising a plurality of antenna elements arranged in an antenna array structure and configured to perform dynamic calibration of the antenna elements for beamforming.

The method comprises, during an antenna calibration opportunity, performing interference level measurements and antenna calibration measurements, and adapting the antenna calibration measurements for one or more of the antenna elements based on the measured interference level.

In some embodiments, the method further comprises repeating the step of performing interference level measurements and antenna calibration measurements during a plurality of antenna calibration opportunities, and adapting the antenna calibration measurements for one or more of the antenna elements based on the measured interference level comprises determining a weighting value for the antenna calibration measurements for each antenna calibration opportunity based on the corresponding measured interference levels.

In some embodiments, the weighting value is determined based on a decreasing function of the measured interference level.

In some embodiments, performing antenna calibration measurements comprises determining respective calibration values for each antenna calibration opportunity of the plurality of antenna calibration opportunities, and adapting the antenna calibration measurements for one or more of the antenna elements based on the measured interference level comprises applying the weighting value for each antenna calibration opportunity to the respective calibration values when average calibration values for the antenna elements of the antenna array are determined for the a plurality of antenna calibration opportunities.

In some embodiments, performing interference level measurements comprises measuring respective interference levels for a plurality of frequencies. In such embodiments, adapting the antenna calibration measurements for one or more of the antenna elements based on the measured interference level may comprise determining calibration values for the antenna elements of the antenna array structure based on antenna calibration measurements for frequencies of the plurality of frequencies that have a measured interference level that indicates that the interference is lower than a first interference threshold value, and (for frequencies of the plurality of frequencies that have a measured interference level that indicates that the interference is greater than the first interference threshold value) determining the calibration values for the antenna elements of the antenna array structure as an interpolation of calibration values determined based on antenna calibration measurements for adjacent frequencies of the plurality of frequencies.

In some embodiments, performing the interference level measurements comprises determining one or more of: a signal-to-noise ratio, SNR, a signal-to-interference ratio, SIR, a signal-to-interference-and-noise ratio, SINR, and a received signal strength indication, RSSI.

In some embodiments, performing the interference level measurements comprises injecting a known test signal at either of a reception path or a transmission path of the communication device, measuring a sensed signal at the antenna elements of the antenna array structure, wherein the sensed signal comprises at least part of the known test signal, and determining the interference level based on a difference between the known test signal and the sensed signal.

In some embodiments, adapting the antenna calibration measurements for one or more of the antenna elements based on the measured interference level comprises avoiding performance of antenna calibration measurements during a remainder of the antenna calibration opportunity when the measured interference level indicates that the interference is greater than a second interference threshold value.

In some embodiments, adapting the antenna calibration measurements for one or more of the antenna elements based on the measured interference level comprises adapting a duration of a subsequent antenna calibration opportunity based on the measured interference level.

In some embodiments, the duration is adapted based on an increasing function of the measured interference level.

In some embodiments, adapting the antenna calibration measurements for one or more of the antenna elements based on the measured interference level comprises adapting an interval length between antenna calibration opportunities based on the measured interference level.

In some embodiments, the interval length is adapted based on a decreasing function of the measured interference level.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a communication device comprising a plurality of antenna elements arranged in an antenna array structure and configured to perform dynamic calibration of the antenna elements for beamforming.

The apparatus comprises controlling circuitry configured to cause, during an antenna calibration opportunity, performance of interference level measurements and antenna calibration measurements, and adaption of the antenna calibration measurements for one or more of the antenna elements based on the measured interference level.

A fourth aspect is a communication device comprising the apparatus of the third aspect.

In some embodiments, any of the above aspects may additionally have features identical with or corresponding to any of the various features as explained above for any of the other aspects.

An advantage of some embodiments is that new approaches to antenna calibration are provided.

Another advantage of some embodiments is that the new approaches to antenna calibration entail improved performance results compared to known approaches. For example, the risk of antenna calibration failure may be decreased (e.g., minimized) compared to known approaches. Thereby, the time required until satisfactory antenna calibration is achieved may be reduced compared to known approaches.

Yet an advantage of some embodiments is that the effect of interference on antenna calibration is decreased compared to known approaches (e.g., minimized).

Yet another advantage of some embodiments is that beamforming performance is not compromised.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Performance results of antenna calibration according to known approaches might be improved. For example, excessive interference negatively impacts the result of antenna calibration. For example, interference may degrade the accuracy of measured calibration signals. Poor calibration may lead to that beamforming performance is not satisfactory (e.g., worsened) and/or the uplink/downlink sensitivity decreased.

At an gNB, interference may be caused from co-sited or nearby-sited equipment, for example. At a UE, interference may be caused by presence of other transmitting UEs in the vicinity, for example.

Figure 1:
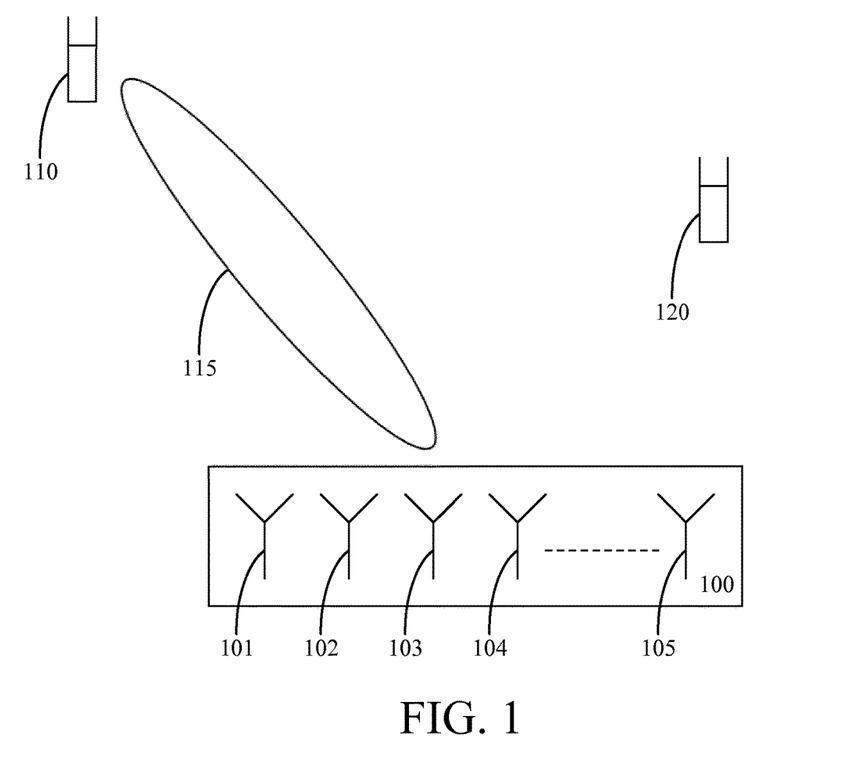
FIG. 1 is a schematic drawing illustrating an example scenario according to some embodiments.

FIG. 1 schematically illustrates an example scenario according to some embodiments. An antenna array 100 of a network node is shown as comprising a plurality of antenna elements 101, 102, 103, 104, 105. Using the antenna array 100, the network node can perform beamformed transmission 115 to a wireless communication device 110, wherein the beamformed transmission 115 is typically not heard at another wireless communication device 120 located in another direction than the wireless communication device 110. As mentioned above, successful beamforming typically requires antenna calibration and such antenna calibration may be negatively impacted by interference.

In the following, embodiments will be described where new approaches to antenna calibration are provided.

First, an example will be described where the calibration procedure is performed multiple times over a series of calibration windows and the calibration values are averaged over the series of calibration windows. The averaging typically aims at providing higher confidence and/or less jitter for the calibration values.

A calibration window is typically a duration in time (e.g., defined via a set of fixed or prescheduled symbols) within which the antenna calibration procedure should be completed.

In frequency division duplex (FDD) deployments, the calibration window may typically be provided by the scheduler as a subframe in which no UE is scheduled. In time division duplex (TDD) deployments, the guard period can be used as a calibration window.

A typical calibration sequence according to some embodiments may be defined as follows:
At the start of the calibration window, an antenna calibration controller measures the interference.
The interference measurement for the particular calibration windows is stored.
If the interference for a selected bandwidth is above a threshold, the antenna calibration procedure for this bandwidth is aborted and a notification is sent to upper layers. The antenna calibration controller may relinquish the airtime.
If the interference is below the predefined threshold for a selected bandwidth, the antenna calibration sequence is considered valid.
The antenna calibration sequence is captured at the designated time and the antenna calibration controller calculates the phase difference between different branches (one branch per antenna element) and the needed compensation vector (calibration values). The antenna calibration controller stores the phase difference together with the measured interference level.
A weighting value is provided based on the measured interference. The weighting value may be proportional to the interference value (e.g., if interference is expressed via SIR or SIINR). The antenna calibration controller stores weighting value together with the phase difference and the measured interference level.
The weights are applied to the calibration values when they are averaged.
The procedure is repeated during the next calibration window.

At the end of the calibration window, the averaged calibration values are sent to the antenna calibration controller, which applies them to the respective antenna element transmit/receive chains.

Figure 2:
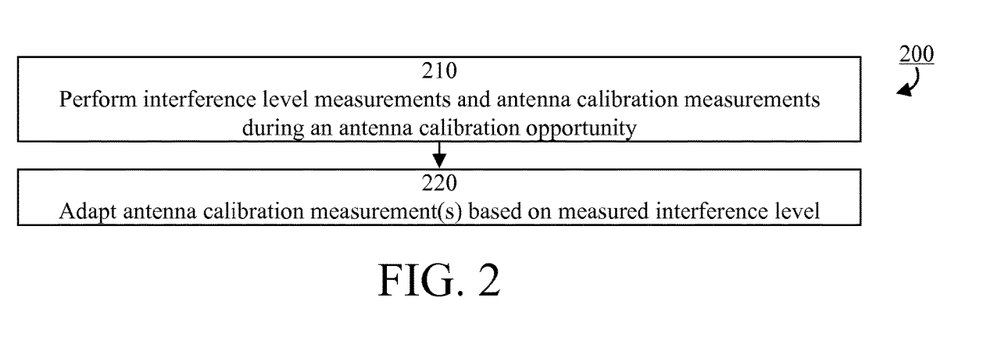
FIG. 2 is a flowchart illustrating example method steps according to some embodiments.

FIG. 2 illustrates an example method 200 according to some embodiments. The method 200 is for a communication device comprising a plurality of antenna elements arranged in an antenna array structure (or antenna arrangement; e.g., an antenna array or an antenna matrix; compare with 100 of FIG. 1). The communication device is configured to perform dynamic calibration of the antenna elements for beamforming, and may, for example, be a network node or a wireless communication device.

In step 210 of the method 200, an interference level is measured during an antenna calibration opportunity (e.g., in an initial phase of an antenna calibration opportunity). Antenna calibration measurements are also performed in step 210.

In step 220 of the method 200, the antenna calibration measurements for one or more of the antenna elements are adapted based on the measured interference level.

One or more of the features described below (e.g., in relation to FIG. 3) may be applicable (singly or in any combination) also to the example method 200.

Figure 3:
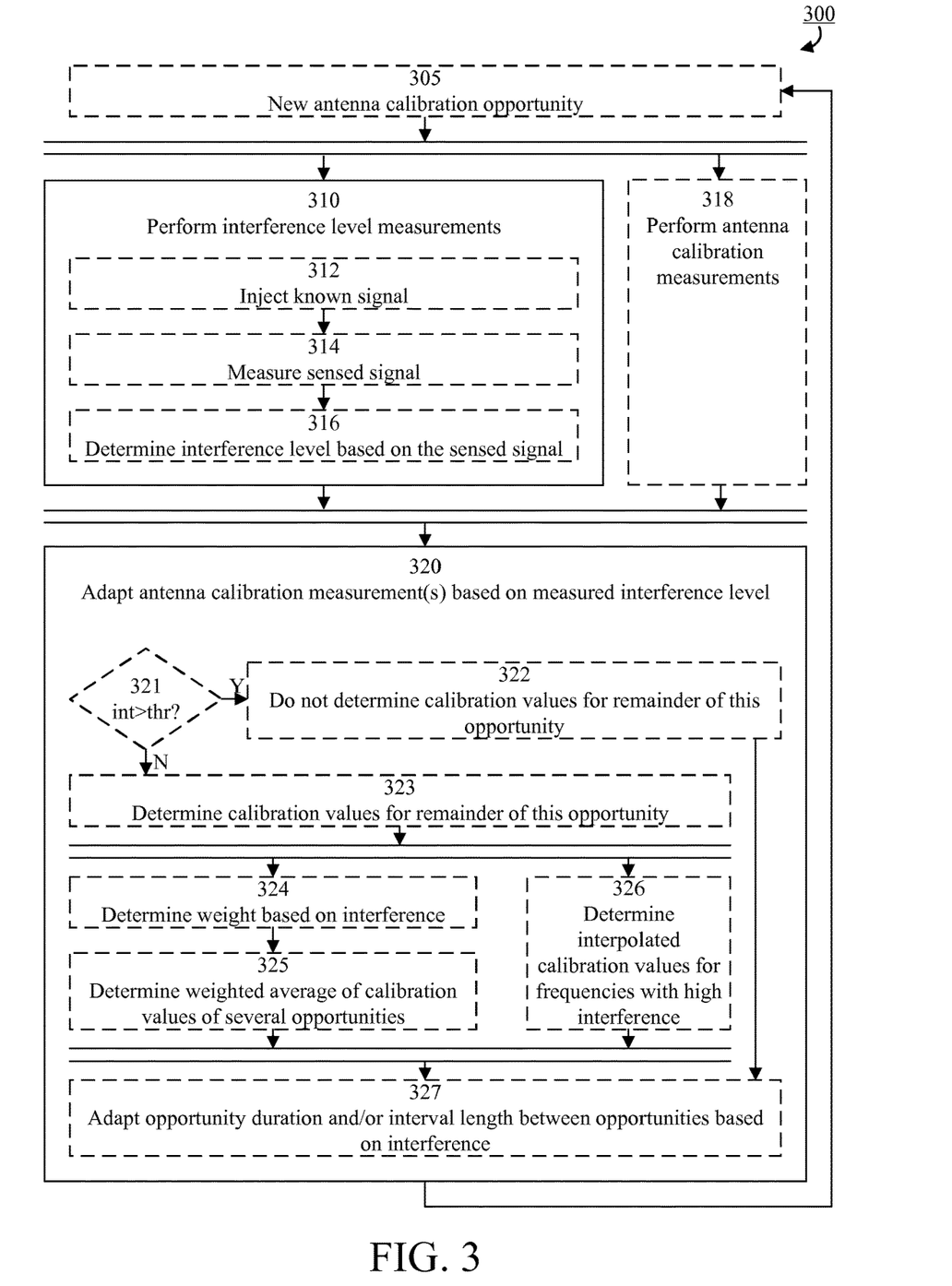
FIG. 3 is a flowchart illustrating example method steps according to some embodiments.

FIG. 3 illustrates an example method 300 according to some embodiments. The method 300 is for a communication device comprising a plurality of antenna elements arranged in an antenna array structure (or antenna arrangement; e.g., an antenna array or an antenna matrix; compare with 100 of FIG. 1). The communication device is configured to perform dynamic calibration of the antenna elements for beamforming, and may, for example, be a network node or a wireless communication device.

Contrarily to distributed antenna systems, a communication device comprising a plurality of antenna elements arranged in an antenna array structure may be interpreted as all of the antenna elements being comprised in a single antenna structure or antenna arrangement, in turn being comprised in a single communication device.

Dynamic calibration of the antenna elements may, for example, be defined as repeatedly performed antenna calibrations and/or antenna calibration measurements enabling adaptation of the antenna calibration measurements to changing conditions (e.g., a varying interference situation). For example, antenna calibrations and/or antenna calibration measurements may be performed once per antenna calibration opportunity, as illustrated by optional step 305 and the loopback from step 320.

The antenna calibration opportunity may, for example, be defined as a duration of time, which is allocated for performing measurements to enable antenna calibration. In some embodiments, the actual antenna calibration is also performed during the antenna calibration opportunity. An example of an antenna calibration opportunity is a calibration window.

Calibration of an antenna element may typically comprise calibration of phase and/or amplitude at the antenna element to accomplish coherent and constructive signal combination at a receiver.

In step 310, an interference level is measured during an antenna calibration opportunity; e.g., in an initial phase of an antenna calibration opportunity (compare with step 210 of FIG. 2).

The initial phase of the antenna calibration opportunity may for example be a duration of time starting at a start of a calibration window.

The interference level may be expressed in any suitable form, e.g., as a signal-to-noise ratio (SNR), a signal-to-interference ratio (SIR), a signal-to-interference-and-noise ratio (SINR), or a received signal strength indication (RSSI) of the interference.

Thus, measuring the interference level may comprise determining one or more of: a signal-to-noise ratio (SNR), a signal-to-interference ratio (SIR), a signal-to-interference-and-noise ratio (SINR), and a received signal strength indication (RSSI).

Alternatively or additionally, measuring the interference level may comprise injecting a known test signal at either of a reception path or a transmission path of the communication device (as illustrated by optional sub-step 312), measuring a sensed signal at the antenna elements of the antenna array structure (as illustrated by optional sub-step 314)—wherein the sensed signal comprises at least part of the known test signal—and determining the interference level based on a difference between the known test signal and the sensed signal (as illustrated by optional sub-step 316). The known test signal may, for example, be an antenna calibration sequence.

In some embodiments, step 310 comprises measuring the interference level without injection of a known test signal (e.g., determining SNR, SIR, SINR or RSSI) and comparing the, thus measured, interference level to a trigger threshold. Then, measuring the interference level also by injecting a known test signal may be triggered only when the comparison indicates a relatively low interference (the interference level falling on a first side of the trigger threshold value).

Generally, when a comparison of some metric to a threshold value is referred to herein, wherein a first thing happens when the metric is greater than the threshold value and another thing happens when the metric is lower than the threshold value, it should be understood that the case wherein the metric is equal to the threshold value can lead to either of the first and second thing happening; depending on implementation.

In optional step 318, antenna calibration measurements are also performed during at least part of the antenna calibration opportunity (compare with step 210 of FIG. 2). Step 318 may be performed—partly or fully—in parallel with step 310 as illustrated in FIG. 1, or may be performed before or after step 310.

In step 320, the antenna calibration measurements are adapted for one or more of the antenna elements is adapted based on the measured interference level (compare with step 220 of FIG. 2).

The adaptation of step 320 may be for antenna calibration measurements of the ongoing antenna calibration opportunity (e.g., for a subsequent phase of the ongoing antenna calibration opportunity) and/or for antenna calibration measurements of one or more future antenna calibration opportunities (e.g., a subsequent antenna calibration opportunity).

Some example ways to adapt the antenna calibration measurements will now be described in combination with reference to optional sub-steps of step 320. It should be noted that this is not intended as limiting, but merely as illustrative. One or more of the example ways to adapt the antenna calibration measurements may be used without any or all of the other example ways to adapt the antenna calibration measurements described in the following.

In optional sub-step 321, the measured interference level (int) is compared to an interference threshold value (thr; a second interference threshold value). The second interference threshold value may be static or dynamic.

In FIG. 3, the comparison of sub-step 321 is illustrated for an interference level representation (e.g., interference RSSI) where a high value indicates relatively high interference and a low value indicates relatively low interference. It should be noted that other interference level representations (e.g., SIR) may have a characteristic where a high value indicates relatively low interference and a low value indicates relatively high interference, in which case the condition of 321 would be reversed (i.e., "int<thr?").

If the comparison indicates that the interference level is relatively high (Y-path out of 321), calibration values are not determined for a remainder of the ongoing antenna calibration opportunity, as illustrated by optional sub-step 322. Thus, antenna calibration measurements are avoided during the remainder of the antenna calibration opportunity.

If the comparison indicates that the interference level is relatively low (N-path out of 321), calibration values are determined for a remainder of the ongoing antenna calibration opportunity based on antenna calibration measurements performed for the ongoing antenna calibration opportunity, as illustrated by optional sub-step 323.

In some embodiments, a weighting value may be determined for the antenna calibration opportunity based on the measured interference level, as illustrated in optional sub-step 324. The weighting value may be a scalar and/or may indicate a reliability of antenna calibration measurements performed in the antenna calibration opportunity. For example, the weighting values may vary between a minimum value (e.g., zero, or a number larger than zero) and a maximum value (e.g., one or a number larger than the minimum value).

For an interference level representation (e.g., interference RSSI) where a high value indicates relatively high interference and a low value indicates relatively low interference, the weighting value may, for example, give relatively high weight to antenna calibration measurements performed in the antenna calibration opportunity when the measured interference level is low, and give relatively low weight to antenna calibration measurements performed in the antenna calibration opportunity when the measured interference level is high. Thus, the weighting value may be determined based on a (strictly or non-strictly) increasing function of the measured interference level, e.g., a linearly increasing function providing proportional relations between the interference level and the weight.

For an interference level representation (e.g., interference SIR) where a high value indicates relatively low interference and a low value indicates relatively high interference, the weighting value may, for example, give relatively low weight to antenna calibration measurements performed in the antenna calibration opportunity when the measured interference level is low, and give relatively high weight to antenna calibration measurements performed in the antenna calibration opportunity when the measured interference level is high. Thus, the weighting value may be determined based on a (strictly or non-strictly) decreasing function of the measured interference level, e.g., a linearly decreasing function providing inversely proportional relations between the interference level and the weight.

The weights may be used for weighted averaging of several antenna calibration measurements in a time domain (e.g., averaging antenna calibration measurements performed in several antenna calibration opportunities) and/or in a frequency domain (e.g., averaging antenna calibration measurements performed for several subcarriers).

For example, as illustrated in optional sub-step 325, the weighting value can be applied to (e.g., multiplied with) the determined calibration values when average calibration values for the antenna elements of the antenna array are determined based on determined calibration values associated with a plurality of antenna calibration opportunities.

Such weighted averaging may further comprise gradually phasing out calibration values determined for old antenna calibration opportunities (e.g., by filtering).

In embodiments where 321 and 322 are not applied, the weight may be set to zero when the measured interference level indicates that the interference is low (e.g., below second interference threshold value).

In some embodiments, sub-steps 324 and 325 are only applied for relatively high interference.

In some embodiments, respective interference levels are measured for a plurality of frequencies (e.g., subcarriers). In such embodiments, one or more of the optional sub-steps 321, 322, 323, 324, 325 may be performed per frequency/subcarrier, which may be beneficial when optimal calibration values differ between frequencies/subcarriers.

Additionally or alternatively when respective interference levels are measured for a plurality of frequencies (e.g., subcarriers), calibration values may be determined—for frequencies/subcarriers with high interference—as an interpolation of calibration values determined for adjacent frequencies/subcarriers, as illustrated in optional sub-step 326.

For example, calibration values may be determined based on antenna calibration measurements for frequencies/subcarriers that have a measured interference level that indicates that the interference is lower than a first interference threshold value (e.g., when SINR is above the threshold value, e.g., 8 dB), and (for frequencies/subcarriers that have a measured interference level that indicates that the interference is greater than the first interference threshold value) the calibration values may be determined as an interpolation of calibration values determined for adjacent frequencies/subcarriers.

In some embodiments, the calibration values for frequencies/subcarriers with high interference may be determined as an interpolation of calibration values determined for two or more neighboring frequencies/subcarriers. The calibration values determined for the neighboring frequencies/subcarriers may be given equal weight in the interpolation, or may be given individual (possibly different) weights in the interpolation. In the latter case, similar principles as explained above for determining weights associated with different antenna calibration opportunities may be applied to determine weights associated with different neighboring frequencies/subcarriers.

The first interference threshold value may be static or dynamic. The first and second interference threshold values may be equal or differing. In a typical example, the first interference threshold value corresponds to an interference that is lower than an interference corresponding to the second interference threshold value.

Alternatively or additionally to the approaches of using weights for averaging antenna calibration values in the time domain (e.g., one weight per antenna calibration opportunity) and/or for averaging antenna calibration values in the frequency domain (e.g., one weight per subcarrier) may utilize pattern recognition for efficiency, some embodiments employ pattern recognition for determination of antenna calibration values (e.g., based on machine learning).

Thus, if there is a recognizable pattern for antenna calibration values, the knowledge of such a pattern may be applied instead of—or in combination with—weighting of antenna calibration values.

For example, if the interference level is relatively high for measurements of the next antenna calibration value, some other way may be needed to estimate this antenna calibration value. According to the time domain weighting described above, averaging of previous antenna calibration values may be applied to this situation. If previous antenna calibration values are 90, 80, 70, 60, 50, 40 (expressed in some suitable metric), such an approach would yield an estimate of 65. On the other hand, if previous antenna calibration values are 90, 80, 70, 60, 50, 40, it is likely according to a pattern recognition approach that the next antenna calibration value will be 30. Thus, the next calibration value may be estimated to 30 for a pattern recognition approach, to 65 for a time averaging approach, or to a value there between for a combined approach.

Generally, either of a pattern recognition approach, an approach of averaging (e.g., in the time domain), and an approach of interpolating in the frequency domain may be applied alone or in any combination, as suitable.

In some embodiments, the duration of an antenna calibration opportunity and/or the interval length (periodicity) between antenna calibration opportunities may be adapted based on the measured interference level, as illustrated in optional sub-step 327.

The duration of the ongoing and/or one or more subsequent antenna calibration opportunities may be adapted based on the measured interference level. For example, the duration may be reduced when the measured interference level indicates a relatively low interference, while the duration may be increased when the measured interference level indicates a relatively high interference. Typically, the duration may be left unchanged when the measured interference level indicates a medium interference.

For an interference level representation (e.g., interference RSSI) where a high value indicates relatively high interference and a low value indicates relatively low interference, the duration of the antenna calibration opportunity may be determined based on a (strictly or non-strictly) increasing function of the measured interference level.

For an interference level representation (e.g., interference SIR) where a high value indicates relatively low interference and a low value indicates relatively high interference, the duration of the antenna calibration opportunity may be determined based on a (strictly or non-strictly) decreasing function of the measured interference level.

The interval length between antenna calibration opportunities may be increased when the measured interference level indicates a relatively low interference, while the interval length may be reduced when the measured interference level indicates a relatively high interference. Typically, the interval length may be left unchanged when the measured interference level indicates a medium interference.

For an interference level representation (e.g., interference RSSI) where a high value indicates relatively high interference and a low value indicates relatively low interference, the interval length between antenna calibration opportunities may be determined based on a (strictly or non-strictly) decreasing function of the measured interference level.

For an interference level representation (e.g., interference SIR) where a high value indicates relatively low interference and a low value indicates relatively high interference, the interval length between antenna calibration opportunities may be determined based on a (strictly or non-strictly) increasing function of the measured interference level.

Figure 4:
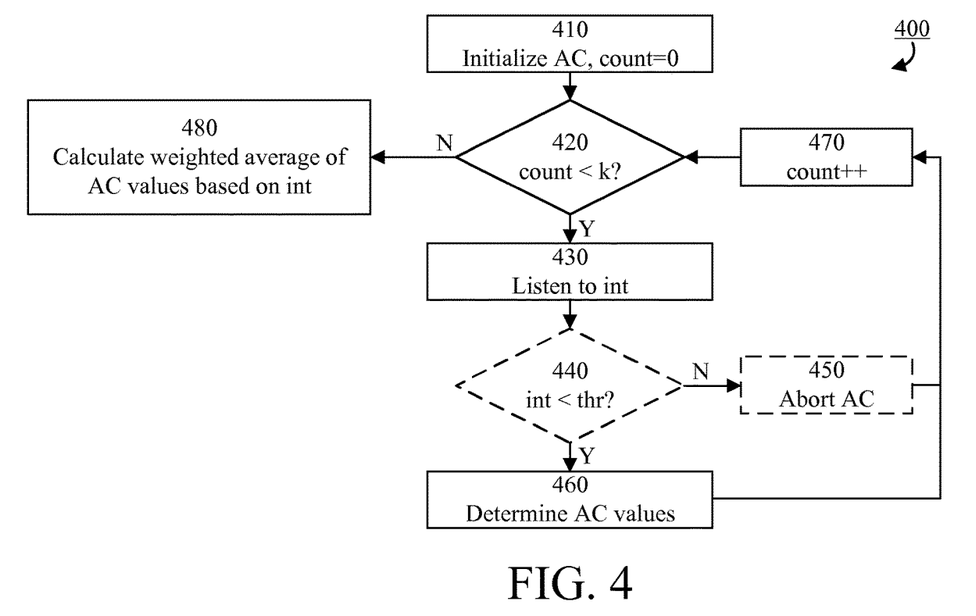
FIG. 4 is a flowchart illustrating example method steps according to some embodiments.

FIG. 4 illustrates an example method 400 according to some embodiments. The method 400 may be seen as an example of any of the methods 200 and 300.

In step 410, antenna calibration (AC) is initialized, and a counter is set to zero.

In step 420, it is determined whether or not the calibration measurement phase is completed by comparing the counter value to a maximum value k.

If the calibration measurement phase is not completed (Y-path out of step 420), the method proceeds to step 430, where interference measurements are performed by listening to interference from other communication devices and/or by injection of a known test signal (compare with step 210 of FIG. 2 and 310 of FIG. 3).

Optionally, in step 440, it may be determined whether the interference is relatively high by comparison to a threshold value (compare with sub-step 321 of FIG. 3). When the interference is determined as relatively high (N-path out of step 440), the method may proceed to optional step 450, where the antenna calibration is aborted for the current calibration opportunity (compare with sub-step 322 of FIG. 3). When the interference is not determined as relatively high (Y-path out of step 440), the method proceeds to step 460.

In step 460, antenna calibration values are determined for the current calibration opportunity according to any suitable approach (compare with sub-step 323 of FIG. 3). Corresponding weight may also be determined (compare with sub-step 324 of FIG. 3) based on a reliability metric such as a confidence level.

After completion of any of the steps 450 and 460, the counter value is incremented as illustrated in step 470, and the method returns to step 420.

When the calibration measurement phase is completed (N-path out of step 420), the method proceeds to step 480, where a weighted average of antenna calibration values from several (e.g., k) calibration opportunities is calculated (compare with sub-step 325 of FIG. 3).

Figure 5:
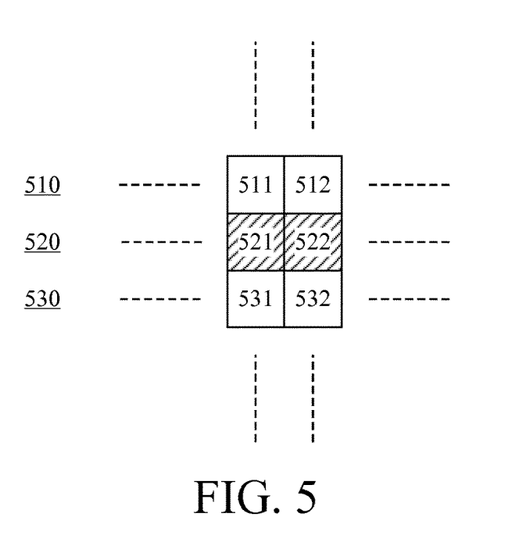
FIG. 5 is a schematic drawing illustrating an example interpolation scenario according to some embodiments.

FIG. 5 schematically illustrates an example interpolation scenario according to some embodiments. In this example, the calibration values for three subcarriers 510, 520, 530 are illustrated over two time periods in a time-frequency grid. The calibration values 511, 512, 531, 532 are determined based on calibration measurements for the subcarriers 510 and 530, respectively. However, for the subcarrier 520, a relatively high interference is measured so it is judged that determining calibration values based on calibration measurements for the subcarrier 520 will not be particularly reliable. Instead, the calibration value 521 is determined as an interpolation between the calibration values 511 and 531, and the calibration value 522 is determined as an interpolation between the calibration values 512 and 532. Thus, the calibration values for subcarrier 520 are determined based on calibration measurements for the adjacent subcarriers 510 and 530.

Figures 6, 7:
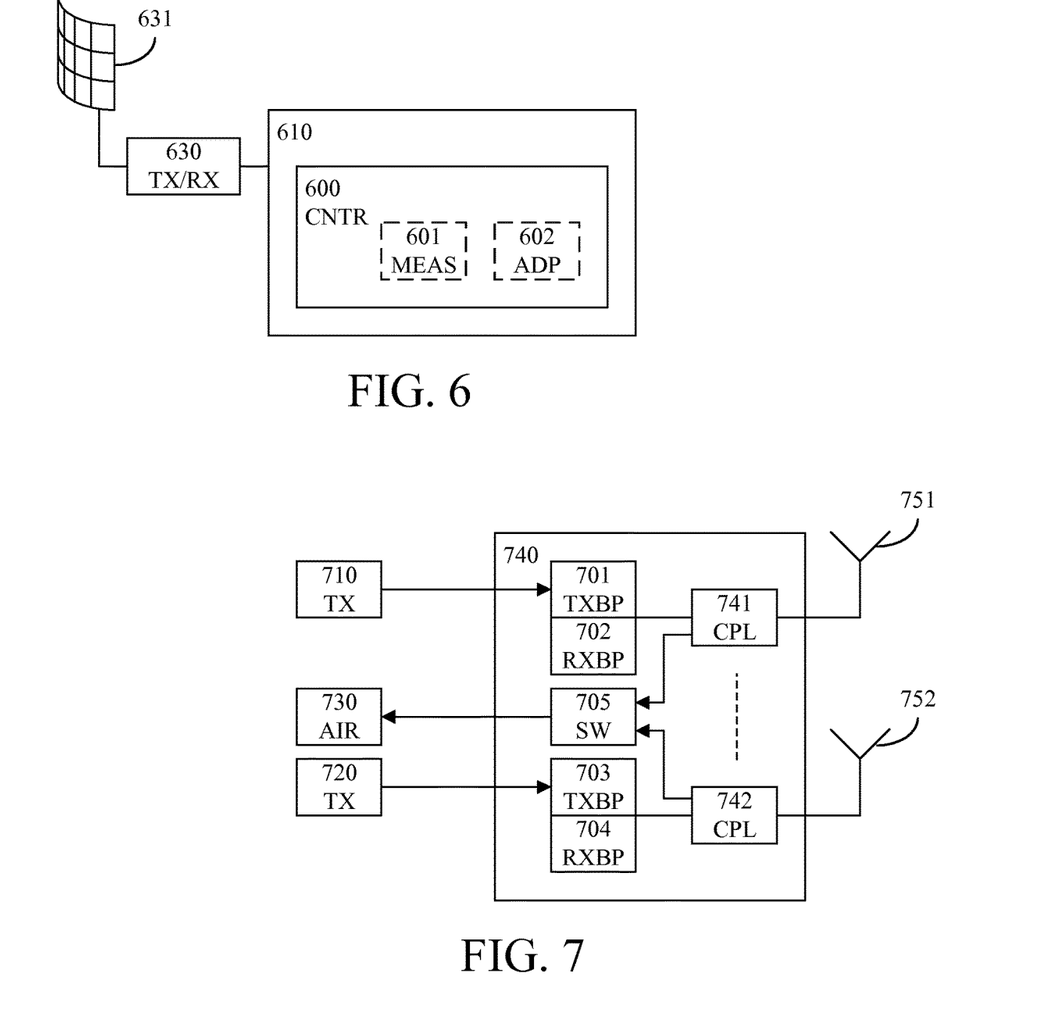
FIG. 6 is a schematic block diagram illustrating an example apparatus according to some embodiments.
FIG. 7 is a schematic block diagram illustrating an example arrangement according to some embodiments.

FIG. 6 schematically illustrates an example apparatus 610 according to some embodiments. The apparatus is for a communication device comprising a plurality of antenna elements arranged in an antenna array structure 631 and configured to perform dynamic calibration of the antenna elements for beamforming. For example, the apparatus 610 may be comprisable (e.g., comprised) in the communication device. The communication device may be a transmission device and/or a reception device. Alternatively or additionally, the communication device may be a network node (e.g., a base station such as a gNB) or a wireless communication device (e.g., a UE). The apparatus may be configured to cause performance of (e.g., configured to perform) one or more of the method steps as explained for any of the FIGS. 2-4, or otherwise disclosed herein. The apparatus comprises a controller (CNTR; e.g., controlling circuitry or a controlling module) 600.

The controller 600 is configured to cause performance of interference level measurements and antenna calibration measurements during an antenna calibration opportunity (compare with step 210 of FIG. 2 and step 310 of FIG. 3).

To this end, the controller 600 may comprise (or be otherwise associated with) a measurer (MEAS; e.g., measurement circuitry or a measurement module) 601. The measurer may be configured to perform the interference level measurements and the antenna calibration measurements during the antenna calibration opportunity.

The measurements of the interference level may be performed using a receiver (e.g., reception circuitry or a reception module—illustrated in FIG. 6 as part of a transceiver, TX/RX) 630 typically connected to the antenna structure 631, which receiver may be utilized to receive the interference.

The controller 600 is also configured to cause adaption of the antenna calibration measurements for one or more of the antenna elements based on the measured interference level (compare with step 220 of FIG. 2 and step 320 of FIG. 3).

To this end, the controller 600 may comprise (or be otherwise associated with) an adapter (ADP; e.g., adaption circuitry or an adaption module) 602. The adapter may be configured to adapt the antenna calibration measurements for one or more of the antenna elements based on the measured interference level.

FIG. 7 schematically illustrates an example arrangement 740 according to some embodiments. The arrangement 740 is for a communication device comprising a plurality of antenna elements 751, 752 arranged in an antenna array structure and configured to perform dynamic calibration for the antenna elements for beamforming. For example, the arrangement 740 may be comprisable (e.g., comprised) in the communication device. The communication device may be a transmission device and/or a reception device. The arrangement 740 may be combined with the controller 600 of FIG. 6 according to some embodiments.

The arrangement 740 is for measuring the interference level by injection of a known test signal at either of a reception path or a transmission path of the communication device, measuring of a sensed signal at the antenna elements of the antenna array structure, wherein the sensed signal comprises at least part of the known test signal, and determination of the interference level based on a difference between the known test signal and the sensed signal.

FIG. 7 illustrates the setup for transmission calibration. The known test signal is injected at the transmission (TX) paths 710, 720, and passes via respective transmission bandpass filters (TXBP) 701, 703 on its way to the respective antenna elements 751, 752.

Each antenna element is associated with a respective coupler (CPL) 741, 742 which couples part of the injected signal back to an antenna interference receiver (AIR) 730 via a switch (SW) 705.

The antenna interference receiver 730 is configured to determine the interference level based on measuring of a sensed signal (in this case, the coupled signal plus any external interference) at the antenna elements. The switch 705 ensures that each antenna element may be calibrated separately.

For reception calibration, the known test signal is injected at the reception paths (not shown), and passes via respective reception band pass filters (RXBP) 702, 704 on its way to the respective antenna elements 751, 752. The couplers 741, 742 couple part of the injected signal back to the antenna interference receiver for determination of the interference level in a similar manner as mentioned above.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 8:
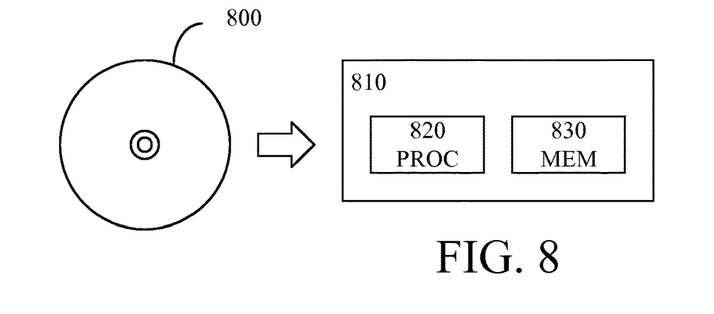
FIG. 8 is a schematic drawing illustrating an example computer readable medium according to some embodiments.

According to some embodiments, a computer program product comprises a computer readable medium (e.g., a non-transitory computer readable medium) such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a wireless communication device or a network node 810. When loaded into the data processor, the computer program may be stored in a memory (MEM) 830 associated with or comprised in the data processor. According to some embodiments, the computer program may, when loaded into and run by the data processor, cause execution of method steps according to, for example, any of the methods illustrated in FIGS. 2-4 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a communication device comprising a plurality of antenna elements arranged in an antenna array structure and configured to perform dynamic calibration of the antenna elements for beamforming, the method comprising:
    during an antenna calibration opportunity, performing interference level measurements and antenna calibration measurements; and
    adapting the antenna calibration measurements for one or more of the antenna elements based on the measured interference level, wherein adapting the antenna calibration measurements for the one or more of the antenna elements based on the measured interference level comprises determining a weighting value for the antenna calibration measurements for each antenna calibration opportunity based on the corresponding measured interference level.

2. The method of claim 1, further comprising repeating the step of performing interference level measurements and antenna calibration measurements during a plurality of antenna calibration opportunities.

3. The method of claim 2, wherein the weighting value is determined based on a decreasing function of the measured interference level.

4. The method of claim 2, wherein performing antenna calibration measurements comprises determining respective calibration values for each antenna calibration opportunity of the plurality of antenna calibration opportunities, and wherein adapting the antenna calibration measurements for one or more of the antenna elements based on the measured interference level comprises applying the weighting value for each antenna calibration opportunity to the respective calibration values when average calibration values for the antenna elements of the antenna array are determined for the plurality of antenna calibration opportunities.

5. The method of claim 1, wherein performing interference level measurements comprises measuring respective interference levels for a plurality of frequencies, and wherein adapting the antenna calibration measurements for one or more of the antenna elements based on the measured interference level comprises:
    determining calibration values for the antenna elements of the antenna array structure based on antenna calibration measurements for frequencies of the plurality of frequencies that have a measured interference level that indicates that the interference is lower than a first interference threshold value; and for frequencies of the plurality of frequencies that have a measured interference level that indicates that the interference is greater than the first interference threshold value, determining the calibration values for the antenna elements of the antenna array structure as an interpolation of calibration values determined based on antenna calibration measurements for adjacent frequencies of the plurality of frequencies.

6. The method of claim 1, wherein performing interference level measurements comprises determining one or more of: a signal-to-noise ratio, SNR, a signal-to-interference ratio, SIR, a signal-to-interference-and-noise ratio, SINR, and a received signal strength indication, RSSI.

7. The method of claim 1, wherein performing interference level measurements comprises:
  injecting a known test signal at either of a reception path or a transmission path of the communication device;
  measuring a sensed signal at the antenna elements of the antenna array structure, wherein the sensed signal comprises at least part of the known test signal; and
  determining the interference level based on a difference between the known test signal and the sensed signal.

8. The method of claim 1, wherein adapting the antenna calibration measurements for one or more of the antenna elements based on the measured interference level comprises avoiding performance of antenna calibration measurements during a remainder of the antenna calibration opportunity when the measured interference level indicates that the interference is greater than a second interference threshold value.

9. The method of claim 1, wherein adapting the antenna calibration measurements for one or more of the antenna elements based on the measured interference level comprises adapting a duration of a subsequent antenna calibration opportunity based on the measured interference level.

10. The method of claim 9, wherein the duration is adapted based on an increasing function of the measured interference level.

11. The method of claim 1, wherein adapting the antenna calibration measurements for one or more of the antenna elements based on the measured interference level comprises adapting an interval length between antenna calibration opportunities based on the measured interference level.

12. An apparatus for a communication device comprising a plurality of antenna elements arranged in an antenna array structure and configured to perform dynamic calibration of the antenna elements for beamforming, the apparatus comprising controlling circuitry configured to cause:
  during an antenna calibration opportunity, performance of interference level measurements and antenna calibration measurements; and
  adaptation of the antenna calibration measurements for one or more of the antenna elements based on the measured interference level, wherein adapting the antenna calibration measurements for one or more of the antenna elements based on the measured interference level comprises determining a weighting value for the antenna calibration measurements for each antenna calibration opportunity based on the corresponding measured interference levels.

13. The apparatus of claim 12, wherein the controlling circuitry is further configured to cause repetition of the performance of interference level measurements and antenna calibration measurements during a plurality of antenna calibration opportunities.

14. The apparatus of claim 13, wherein the controlling circuitry is configured to cause performance of antenna calibration measurements by causing determination of respective calibration values for each antenna calibration opportunity of the plurality of antenna calibration opportunities, and wherein the controlling circuitry is configured to cause adaptation of the antenna calibration measurements for one or more of the antenna elements based on the measured interference level by causing:
  application of the weighting value for each antenna calibration opportunity to the respective calibration values when average calibration values for the antenna elements of the antenna array structure are determined for the plurality of antenna calibration opportunities.

15. The apparatus of claim 12, wherein the controlling circuitry is configured to cause performance of interference level measurements by causing measuring of respective interference levels for a plurality of frequencies, and wherein the controlling circuitry is configured to cause adaptation of the antenna calibration measurements for one or more of the antenna elements based on the measured interference level by causing:
  determination of calibration values for the antenna elements of the antenna array structure based on antenna calibration measurements for frequencies of the plurality of frequencies that have a measured interference level that indicates that the interference is lower than a first interference threshold value; and
  for frequencies of the plurality of frequencies that have a measured interference level that indicates that the interference is greater than the first interference threshold value, determination of the calibration values for the antenna elements of the antenna array structure as an interpolation of calibration values determined based on antenna calibration measurements for adjacent frequencies of the plurality of frequencies.

16. The apparatus of claim 12, wherein the controlling circuitry is configured to cause performance of interference level measurements by causing determination of one or more of: a signal-to-noise ratio, SNR, a signal-to-interference ratio, SIR, a signal-to-interference-and-noise ratio, SINR, and a received signal strength indication, RSSI.

17. The apparatus of claim 12, wherein the controlling circuitry is configured to cause performance of interference level measurements by causing:
  injection of a known test signal at either of a reception path or a transmission path of the communication device;
  measuring of a sensed signal at the antenna elements of the antenna array structure, wherein the sensed signal comprises at least part of the known test signal; and
  determination of the interference level based a difference between the known test signal and on the sensed signal.

18. The apparatus of claim 12, wherein the controlling circuitry is configured to cause adaptation of the antenna calibration measurements for one or more of the antenna elements based on the measured interference level by causing avoidance of performance of antenna calibration measurements during a remainder of the antenna calibration opportunity when the measured interference level indicates that the interference is greater than a second interference threshold value.

19. The apparatus of claim 12, wherein the controlling circuitry is configured to cause adaptation of the antenna calibration measurements for one or more of the antenna elements based on the measured interference level by causing adaptation of a duration of a subsequent antenna calibration opportunity based on the measured interference level.

20. The apparatus of claim 12, wherein the controlling circuitry is configured to cause adaptation of the antenna calibration measurements for one or more of the antenna elements based on the measured interference level by causing adaptation of an interval length between antenna calibration opportunities based on the measured interference level.

* * * * *